(12) United States Patent
Byron, Jr. et al.

(10) Patent No.: US 6,712,944 B2
(45) Date of Patent: Mar. 30, 2004

(54) GAS/LIQUID PHASE SEPARATOR FOR ELECTROLYSIS CELL

(75) Inventors: Robert H. Byron, Jr., Glastonbury, CT (US); Michael J. Brown, Ellington, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 18 days.

(21) Appl. No.: 09/908,449

(22) Filed: Jul. 18, 2001

(65) Prior Publication Data

US 2002/0023836 A1 Feb. 28, 2002

Related U.S. Application Data

(60) Provisional application No. 60/287,654, filed on Apr. 30, 2001, and provisional application No. 60/219,530, filed on Jul. 20, 2000.

(51) Int. Cl.[7] ............ C25B 9/00; C25B 15/02; F16K 21/18; B01D 19/00
(52) U.S. Cl. ............ 204/266; 204/278; 137/397; 137/411; 137/423; 96/158; 96/165; 96/168; 96/189; 96/219
(58) Field of Search ............ 204/242, 252, 204/263, 266, 275.1, 278; 137/171, 192, 202, 392, 395, 396, 397, 398, 409, 411, 423; 96/155, 156, 157, 158, 159, 165, 168, 188, 189, 219

(56) References Cited

U.S. PATENT DOCUMENTS

| | | | | |
|---|---|---|---|---|
| 3,868,321 A | * | 2/1975 | Gough | 210/86 |
| 3,966,437 A | * | 6/1976 | DeWolf et al. | 96/411 |
| 4,722,744 A | * | 2/1988 | Stoll | 96/410 |
| 5,035,346 A | * | 7/1991 | Kalman | 222/68 |
| 5,037,518 A | * | 8/1991 | Young et al. | 204/228.5 |
| 5,172,714 A | * | 12/1992 | Kobayashi et al. | 137/39 |
| 5,200,278 A | | 4/1993 | Watkins et al. | 429/24 |
| 5,362,368 A | * | 11/1994 | Lynn et al. | 205/335 |
| 5,381,956 A | * | 1/1995 | Robinson et al. | 239/22 |
| 5,398,716 A | * | 3/1995 | Hsu | 137/195 |
| 5,981,096 A | | 11/1999 | Hornburg et al. | 429/17 |
| 6,063,515 A | | 5/2000 | Epp et al. | 429/17 |
| 6,402,799 B1 | * | 6/2002 | Kokubo et al. | 55/396 |

FOREIGN PATENT DOCUMENTS

| | | |
|---|---|---|
| EP | 0 339 187 A | 11/1989 |
| FR | 817 703 A | 9/1937 |
| JP | 59209628 A * | 11/1984 ........... B01D/49/00 |

OTHER PUBLICATIONS

PCT International Search Report; International Application No. PCT/US 01/22497; International filing date Jul. 18, 2001; Date of Mailing: Jun. 18, 2002.

* cited by examiner

*Primary Examiner*—Nam Nguyen
*Assistant Examiner*—Brian L Mutschler
(74) *Attorney, Agent, or Firm*—Cantor Colburn LLP

(57) ABSTRACT

A gas/liquid phase separator for an electrolysis cell includes a vessel and a float in operable communication with each other. The vessel includes a fluid inlet and first and second fluid outlets. A fluid stream comprising gas and liquid is received in the vessel through the fluid inlet, and at least a portion of the gas exits the vessel through the second fluid outlet. The float is configured to interface with the first fluid outlet and either maintain or prevent fluid communication across the first fluid outlet when the float is in at least partial contact with the first fluid outlet.

20 Claims, 7 Drawing Sheets

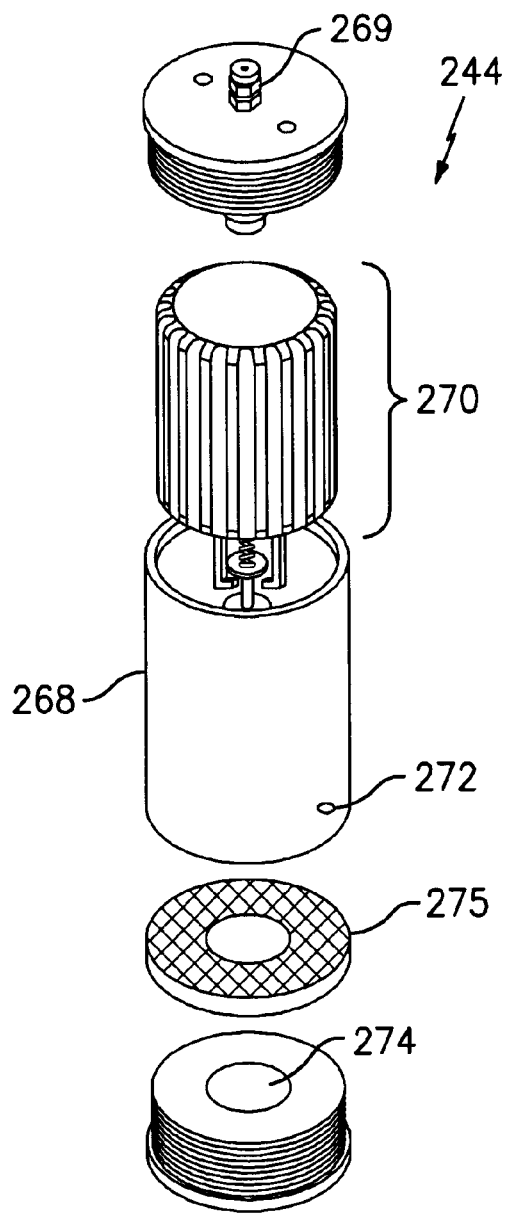
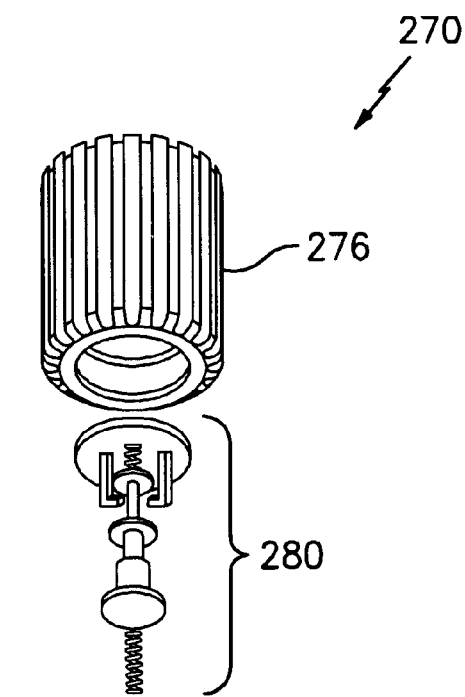
FIG. 6
FIG. 7A

GAS/LIQUID PHASE SEPARATOR FOR ELECTROLYSIS CELL

CROSS REFERENCE TO RELATED APPLICATIONS

This application claims the benefits of U.S. Provisional Patent Application Ser. No. 60/219,530 filed Jul. 20, 2000, and U.S. Provisional Patent Application Ser. No. 60/287,654 filed Apr. 30, 2001, the entire contents of both applications being incorporated herein by reference.

BACKGROUND

This disclosure relates to electrochemical cell systems, and in particular to gas/liquid phase separators for electrolysis cell systems.

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of the water are discharged from cell 10, while protons 15 and a second portion 24 of the water migrate across a proton exchange membrane 26 to cathode 20. At cathode 20, hydrogen gas 28 is removed, generally through a gas delivery line. The removed hydrogen gas 28 is usable in a myriad of different applications. Second portion 24 of water is also removed from cathode 20.

An electrolysis cell system may include a number of individual cells arranged in a stack with reactant water 12 being directed through the cells via input and output conduits formed within the stack structure. The cells within the stack are sequentially arranged, and each one includes a membrane electrode assembly defined by a proton exchange membrane disposed between a cathode and an anode. The cathode, anode, or both may be gas diffusion electrodes that facilitate gas diffusion to the proton exchange membrane. Each membrane electrode assembly is in fluid communication with flow fields adjacent to the membrane electrode assembly, defined by structures configured to facilitate fluid movement and membrane hydration within each individual cell.

The second portion 24 of water discharged from the cathode side of cell 10, which is entrained with hydrogen gas, is fed to a phase separation unit to separate the hydrogen gas from the water, thereby increasing the hydrogen gas yield and the overall efficiency of cell 10 in general. Phase separation units utilized in current hydrogen generation and fuel cell systems employ trap designs within pressure vessels. High-pressure trap designs incorporate pivoting float offsets to accomplish proper lift by using a lever and fulcrum configuration. In order to be properly operational, such systems generally require excessive space within the system enclosures.

SUMMARY

A gas/liquid phase separator for an electrolysis cell is disclosed. The gas/liquid separator includes a vessel and a float in operable communication with each other. The vessel includes a fluid inlet and first and second fluid outlets. A fluid stream comprising gas and liquid is received in the vessel through the fluid inlet, and at least a portion of the gas exits the vessel through the second fluid outlet. The float is configured to interface with the first fluid outlet and to either maintain or prevent fluid communication across the first fluid outlet when the float is in at least partial contact with the first fluid outlet.

BRIEF DESCRIPTION OF THE FIGURES

FIG. 6 is an exploded perspective view of a gas/water phase separator having an alternate float assembly, the gas/water phase separator being configured to receive an outlet stream from an electrolysis cell.

FIG. 7A is an exploded perspective view of the alternate float assembly of FIG. 6.

DETAILED DESCRIPTION

Figure 2:
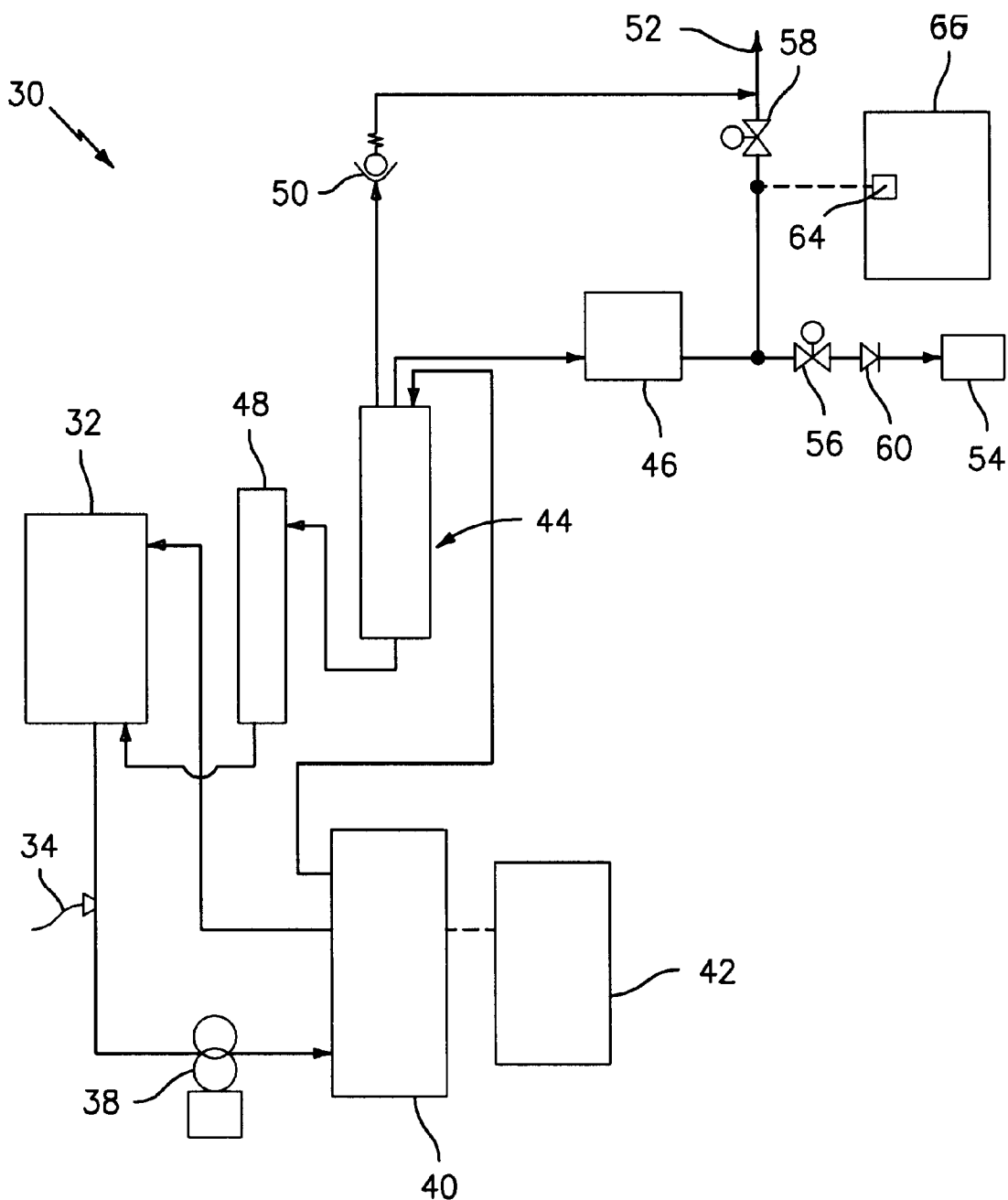
FIG. 2 is a schematic representation of a gas generating apparatus into which an electrolysis cell system may be incorporated.

Referring to FIG. 2, an exemplary embodiment of an electrolysis cell system is shown generally at 30 and is hereinafter referred to as "system 30." System 30 is suitable for generating hydrogen for use in gas chromatography, as a fuel, and for various other applications. It is to be understood that while the inventive improvements described below are described in relation to an electrolysis cell, the improvements are generally applicable to both electrolysis and fuel cells, particularly regenerative fuel cells. Furthermore, although the description and figures are directed to the production of hydrogen and oxygen gas by the electrolysis of water, the apparatus is applicable to the generation of other gases from other reactant materials.

Exemplary system 30 includes a water-fed electrolysis cell capable of generating gas from reactant water and is operatively coupled to a control system. Suitable reactant water is deionized, distilled water and is continuously supplied from a water source 32. The reactant water utilized by system 30 is stored in water source 32 and is fed by gravity or pumped through a pump 38 into an electrolysis cell stack 40. The supply line, which is preferably clear plasticizer-free tubing, includes an electrical conductivity sensor 34 disposed therewithin to monitor the electrical potential of the water, thereby determining its purity and ensuring its adequacy for use in system 30.

Figure 1:
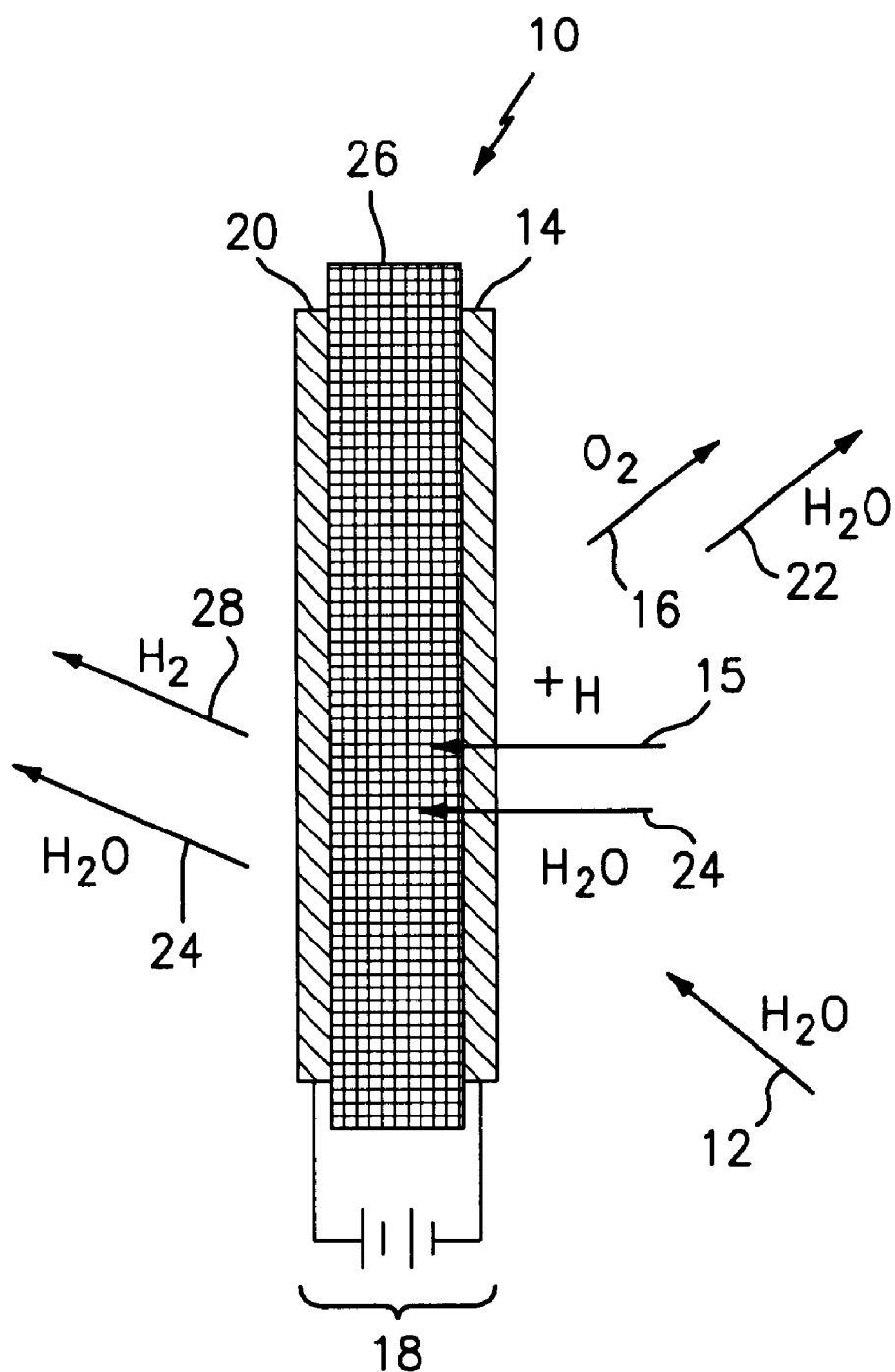
FIG. 1 is a schematic representation of an anode feed electrolysis cell of the prior art.

Cell stack 40 comprises a plurality of cells similar to cell 10 described above with reference to FIG. 1 encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water.

Oxygen and water exit cell stack 40 via a common stream and are ultimately returned to water source 32, whereby the water is recycled and the oxygen is vented to the atmosphere. The hydrogen stream, which contains water, exits cell stack 40 and is fed to a phase separation tank, which is a hydrogen/water separation apparatus 44, hereinafter referred to as "separator 44" where the gas and liquid phases are separated. This hydrogen stream has a pressure that is preferably about 250 pounds per square inch (psi), but which may be anywhere from about 1 psi to about 6000 psi. Some water is removed from the hydrogen stream at separator 44. The exiting hydrogen gas (having a lower water content than the hydrogen stream to separator 44) is further dried at a drying unit 46, which may be, for example, a diffuser, a pressure swing absorber, or desiccant. Water with trace amounts of hydrogen entrained therein is returned to water source 32 through a low pressure hydrogen separator 48. Low pressure hydrogen separator 48 allows hydrogen to escape from the water stream due to the reduced pressure, and also recycles water to water source 32 at a lower pressure than the water exiting separator 44. Separator 44 also includes a release 50, which may be a relief valve, to rapidly purge hydrogen to a hydrogen vent 52 when the pressure or pressure differential exceeds a preselected limit.

Pure hydrogen from diffuser 46 is fed to a hydrogen storage 54. Valves 56, 58 are provided at various points on the system lines and are configured to release hydrogen to vent 52 under certain conditions. Furthermore, a check valve 60 is provided that prevents the backflow of hydrogen to diffuser 46 and separator 44.

A ventilation system (not shown) is provided to assist in venting system gases when necessary. The ventilation system comprises a fan portion that continually purges the air in the enclosure of system 30. An airflow switch is mounted on the fan portion and is configured to interrupt the power to cell stack 40 in the event of a failure in the fan portion, thereby halting the production of hydrogen gas.

A hydrogen output sensor 64 is incorporated into system 30. Hydrogen output sensor 64 may be a pressure transducer that converts the gas pressure within the hydrogen line to a voltage or current value for measurement. However, hydrogen output sensor 64 can be any suitable output sensor other than a pressure transducer, including, but not limited to, a flow rate sensor, a mass flow sensor, or any other quantitative sensing device. Hydrogen output sensor 64 is interfaced with a control unit 66, which is capable of converting the voltage or current value into a pressure reading. Furthermore, a display means (not shown) may be disposed in operable communication with hydrogen output sensor 64 to provide a reading of the pressure, for example, at the location of hydrogen output sensor 64 on the hydrogen line. Control unit 66 is any suitable gas output controller, such as an analog circuit or a digital microprocessor.

Figure 3B:
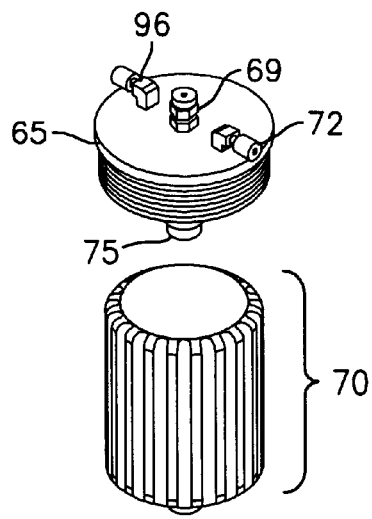
FIG. 3B is a perspective view of a float assembly of the gas/water phase separator of FIG. 3A.
Figure 3B:
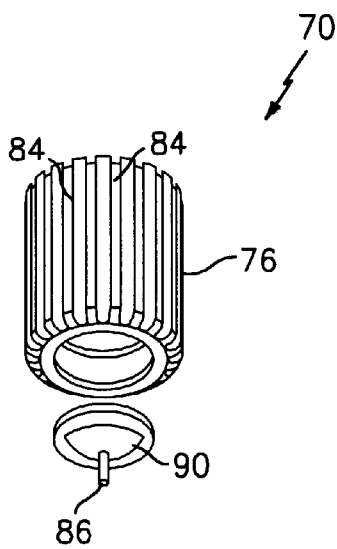
Figure 3A:
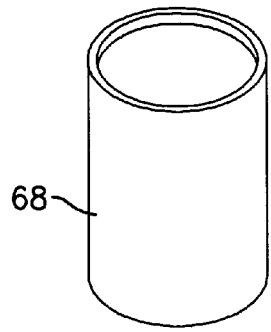
FIG. 3A is an exploded perspective view of a gas/water phase separator configured to receive an outlet stream from an electrolysis cell.
Figure 3A:
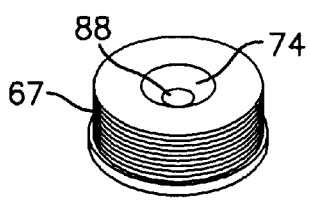

Referring now to FIG. 3A, separator 44 and its componentry is shown in greater detail. Separator 44 is constructed of various materials including metals or plastics that allow separator 44 to accommodate pressures of up to about 2500 pounds per square inch (psi) and preferably up to about 6000 psi. Metals that may be used to fabricate the various portions of separator 44 include, but are not limited to, stainless steels, titanium, nickel, and alloys or mixtures of at least one of the foregoing metals. Plastics that may be used to fabricate the various portions of separator 44 include, but are not limited to, polycarbonates, polyethylenes, polypropylenes, and blends of at least one of the foregoing plastics.

Separator 44, which is essentially a containment vessel, comprises a body portion 68, an inlet cap 65, an outlet cap 67, and a float assembly, shown generally at 70, buoyantly disposed within body portion 68. A fluid inlet 72 for receiving a two-phase stream from the cell stack, for example hydrogen and water as described generally above, is disposed within inlet cap 65. A check valve (not shown) may be disposed within the inlet water stream to prevent the backflow of water from separator 44. As the two-phase mixture is deposited into body portion 68 through water inlet 72, the larger molecules of water settle to the bottom of the vessel, while the smaller molecules of water collect on the surface of a coalescing filter 75.

Coalescing filter 75 may be any suitable device for allowing saturated hydrogen to coalesce. Coalescing filter 75 can be formed of a porous coalescing material, such as polytetrafluoroethylene, polyethylene, polypropylene, or any combination of at least one of the foregoing materials. The shape of coalescing filter 75 is conducive to capturing a maximum amount of the saturated hydrogen stream and facilitating further drying of the hydrogen stream. For example, coalescing filter 75 may be configured as a hemisphere or a cylinder having a hemispherical surface disposed at the end thereof. Generally, water droplets of the saturated gas stream coalesce on the surface of coalescing filter 75, allowing the hydrogen gas to diffuse into the vapor phase and exit separator 44 through vapor outlet 69 while the water droplets eventually fall into the liquid phase.

The water collected in the vessel is maintained at a preselected level, which necessitates the periodic drainage through an orifice 88 disposed in a water outlet 74 of outlet cap 67. Hydrogen gas then diffuses from the water into the vapor phase and exits separator 44 through vapor outlet 69. Upon its exit from vapor outlet 69, the exiting hydrogen gas is substantially water-free and is ready for final drying in the drying unit, as was described above with reference to FIG. 2. The dimensions of separator 44, particularly the diameter thereof, affect the velocity of the mixed phase gas stream entering through water inlet 72. The variations in velocity in turn affect the dispersion rate of hydrogen from the mixed phase gas stream.

A release system comprising an outlet 96 may also be included in separator 44. Outlet 96 is in fluid communication with a drainage line (not shown), which provides for the drainage of water when separator 44 is filled to capacity.

Referring now to FIG. 3B, float assembly 70 is shown in greater detail. Float assembly 70 is used to prevent or allow water expulsion through the water outlet and comprises a float 76, a conical protrusion 90 disposed on a lower end of float 76, and a stem 86 extending from conical protrusion 90. Conical protrusion 90 and stem 86 are configured and dimensioned to be received in the water outlet to assist in seating float 76 into the orifice, as is described below with reference to FIG. 4. Stem 86 may be attached to or integrally formed with conical protrusion 90 and is appropriately dimensioned and formed of a suitable material such that a bubble-tight seal is formed when stem 86 is received in the orifice, thereby preventing fluid communication across the water outlet. Suitable materials for the fabrication of stem 86 include, but are not limited to, fluoroelastomers, such as VITON® (commercially available from Dupont de Nemours) and terpolymers of ethylene and propylene, such as EPDM.

Float 76 is a direct-lift float. Generally, in a direct-lift float, the buoyant effect of the float must be greater than the force exerted on the bottom of the float that "pulls" the float such that the orifice through the water outlet is sealed or at least partially sealed. As the water level within the separator rises and falls, the position of float 76 fluctuates accordingly. Float 76 may be constructed of various materials, including metals or plastics. Metals that may be used in the construction of float 76 include stainless steel, (e.g., type 316 stainless steel), titanium, and alloys or mixtures of at least one of the foregoing metals. Plastics that may be used for the construction of float 76 include, but are not limited to, polycarbonates, polypropylenes, polyethylenes (e.g., HDPE or UHMWPE), and blends of at least one of the foregoing plastics. In one embodiment, the separator 44 is polycarbonate and float 76 is polypropylene.

Float 76 may further be configured with an outer surface having one or more regions 84 that provide fluid communication between the opposing ends of float 76 when float 76 is disposed within the body portion of the separator. Regions 84 are vertically arranged equidistantly around the outer surface of float 76 to provide for simplified fluid flow across the outer surfaces of float 76. Regions 84 may further be dimensioned to be semi-cylindrical. Benefits obtained by the provision of regions 84 are decreased friction between the outside of float 76 and the inside surface of the body portion of the separator, as well as reduced size requirements of float 76 and/or the separator.

Figure 4:
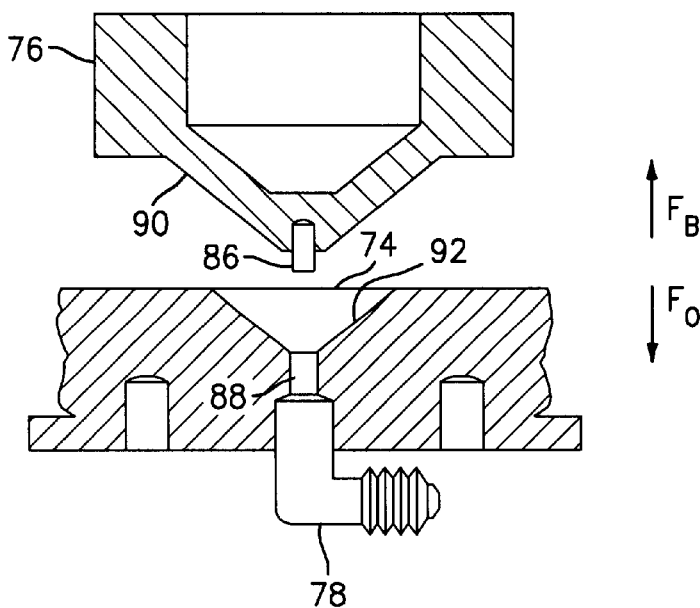
FIG. 4 is a sectional view of a float of a gas/water phase separator and a seating surface of a liquid outlet.

Referring now to FIG. 4, float 76 and its engagement with water outlet 74 are shown. Orifice 88 is disposed within water outlet 74 such that conical protrusion 90 registers with water outlet 74 and stem 86 is receivable in orifice 88. Water outlet 74 is configured to optimize the force exerted on float 76 and includes a conically-oriented mating surface 92 dimensioned to facilitate the engagement of float 76 with water outlet 74 via the engagement of conical protrusion 90 with mating surface 92. Orifice 88, as well as mating surface 92, may be machined directly into water outlet 74. A connector 78 is received in an end of orifice 88 opposing the end on which mating surface 92 is disposed to provide a connection point on which tubing (not shown) can be received to effectuate the drainage of water from the separator. Connector 78 may be integrally formed with water outlet 74; alternately, connector 78 may be configured as a separate component insertable into orifice 88 after manufacture of the separator and during assembly of the system into which the separator is installed. Connector 78 may be fabricated of materials that are the same or different from the materials used for the separator and/or the float, including the various metals and plastics disclosed above. In one exemplary embodiment of the separator, connector 78 is stainless steel, which is generally cost efficient and easy to precisely machine to specific dimensions.

The dimensions of orifice 88 are generally determined by balancing a buoyant force $F_B$ of float 76 with a force $F_O$ at orifice 88. Force $F_B$ is determined by the mass and volume of float 76. Force $F_O$ is determined by the pressure within the separator and the diameter of orifice 88. The ratio of force $F_B$ to force $F_O$ ($F_B/F_O$) is generally between about 50% and about 95% and preferably between about 80% and about 95%. For example, for a separator having an inside diameter of 3.00 inches (in.) (7.62 centimeters (cm)) and a height of 7.735 in. (19.65 cm); a float having a diameter of between about 2.688 in. (6.83 cm) and 2.938 in. (7.46 cm) (the diameter range being due to the provision of regions 84), a height of about 4.6 in. (11.68 cm), and a mass of 0.595 pounds (0.27 kilograms); suitable diameters for orifice 88 are between about 0.005 in. (0.127 millimeters, mm) and about 0.1 in. (2.54 mm), preferably between about 0.0075 in. (0.191 mm) and about 0.015 in. (0.381 mm), and more preferably about 0.01 in. (0.254 mm).

Figure 5A:
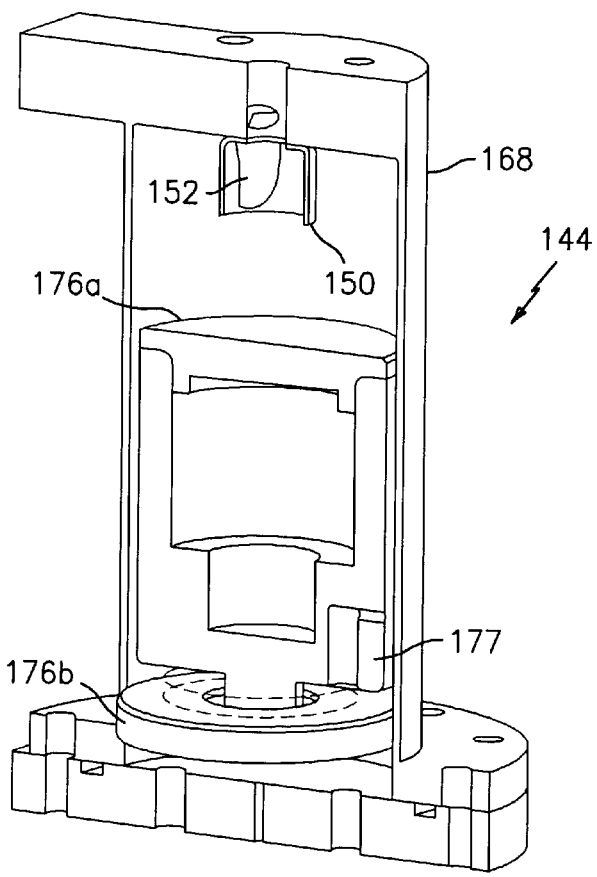
FIG. 5A is a perspective sectional view of a gas/water phase separator incorporating two floats.
Figure 5B:
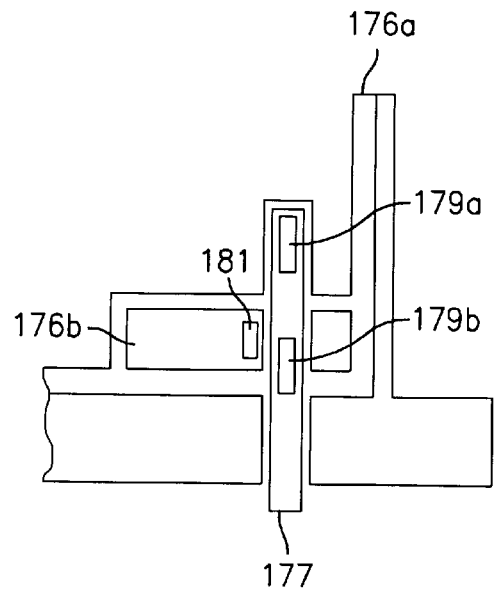
FIG. 5B is a sectional view of a switching device of the gas/water phase separator of FIG. 5A.

Referring now to FIGS. 5A and 5B, another exemplary embodiment of a separator is shown generally at 144. Separator 144 includes a body portion 168, a first float 176a, and a second float 176b. Floats 176a, 176b move within body portion 168 independently of each other and in response to fluctuations in the water level. Integrated level control is effectuated by the use of a standard level sensor stem 177 (containing reed switches 179a and 179b) and a magnet 181 embedded into second float 176b. Stem 177 is stationary; thus, when second float 176b rises or drops due to changes in the water level, magnet 181 triggers the appropriate reed switch 179a, 179b. Reed switches 179a, 179b may be operatively interconnected with a monitoring or control device, e.g., control unit 66 as is illustrated in FIG. 2, such that appropriate action may be taken under certain water level conditions. With the inclusion of second float 176b, separate level detection floats are not needed.

Referring now to FIG. 6, another exemplary embodiment of a separator is shown generally at 244. Separator 244 comprises a body portion 268 and a float assembly 270 buoyantly disposed therein. A water stream is fed from the cell stack of the generator and is received in body portion 268 through a water inlet 272 disposed proximate a lower end of separator 244. A screen 275 is mounted in body portion 268 above water inlet 272 to effectively mitigate the water flow from water inlet 272 into an upper end of body portion 268. Hydrogen gas diffuses from the water phase into a vapor phase over the water and exits separator 244 through a vapor outlet 269 disposed in the upper end of body portion 268. Water drains from separator 244 through a water outlet 274 disposed in the lower end of body portion 268.

Figure 7B:
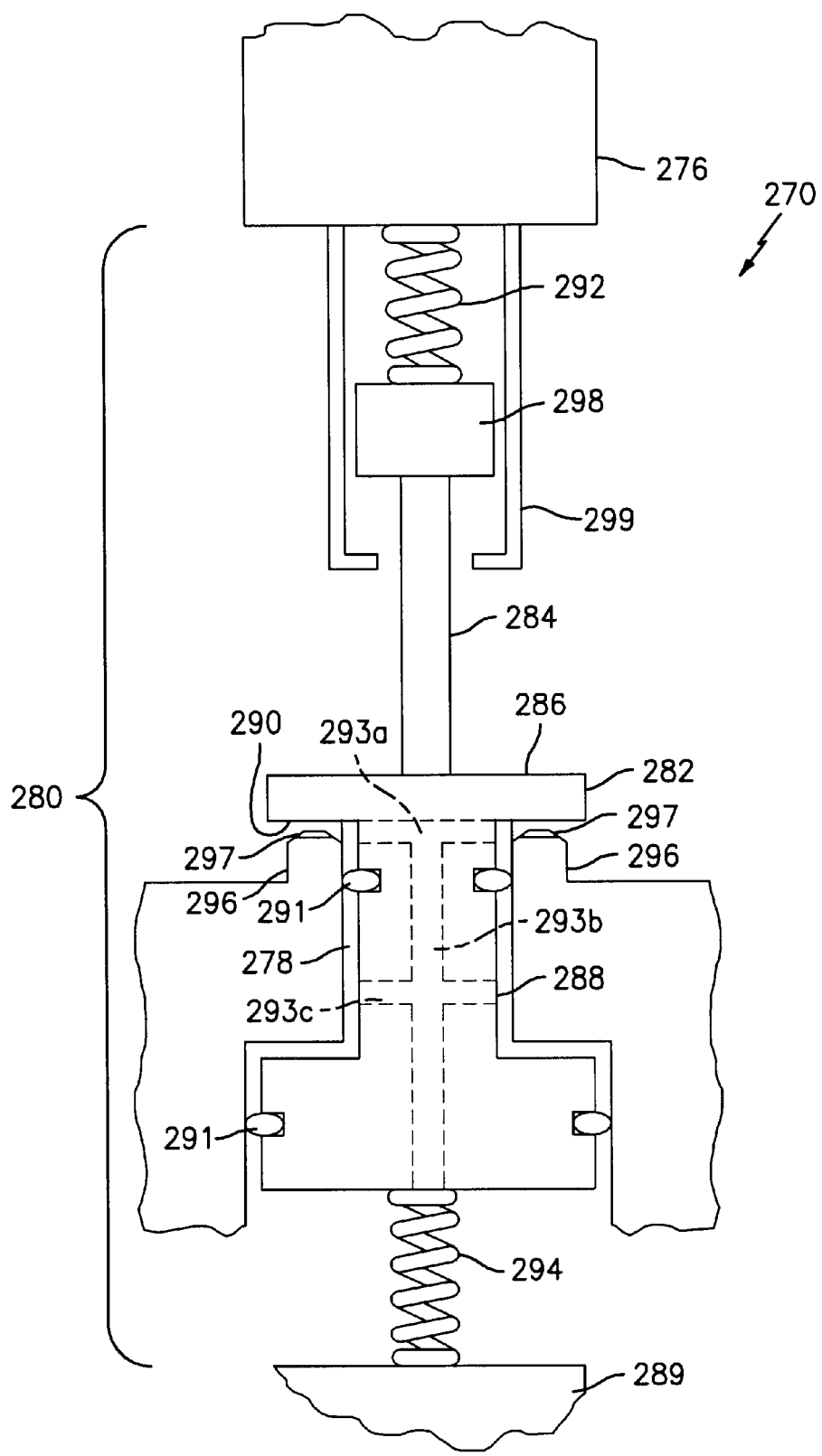
FIG. 7B is a sectional view of the alternate float assembly of FIG. 6.

Referring now to FIGS. 7A and 7B, float assembly 270 is shown in greater detail. Float assembly 270 is spring operable and is used to prevent or allow the drainage of water through the water outlet by utilizing a buoyantly actuatable mechanical arrangement of springs in conjunction with a float 276. A seat portion (shown in FIG. 7B) in the lower end of body portion 268 is configured to accommodate float assembly 270. Float assembly 270 comprises float 276 and a double spring poppet assembly, shown generally at 280, maintained in resilient communication with float 276. Float 276 buoyantly actuates double spring poppet assembly 280 in response to the translation of float 276 in a direction corresponding with the rise or fall of the water level (not shown) in the separator. The resilient communication between float 276 and double spring poppet assembly 280 is maintained via a spring connection.

Referring specifically to FIG. 7B, double spring poppet assembly 280 comprises a poppet 282 having a plunger 284 extending substantially normally from an upper surface 286 and an alignment stem 288 depending substantially normally from an opposing lower surface 290. An upper spring 292 is disposed in resilient communication with plunger 284 and float 276. A lower spring 294 is disposed in resilient communication with alignment stem 288 and a surface 289 from which double spring poppet assembly 280 can be biased. Both springs 292, 294 are configured and dimensioned to provide limiting movement to double spring poppet assembly 280 in opposing directions and are fabricated from materials that are tolerant of the electrolysis cell environment. Such materials include, but are not limited to, titanium, stainless steels such as type 316, nickel, and nickel/chromium alloys such as Iconel.

Alignment stem 288 is configured to extend into orifice 278 such that lower surface 290 is engageable with a seat 296 circumferentially disposed about orifice 278. Seat 296 may include an elastomeric member 297 to provide an effective seal when poppet 282 engages orifice 278. Intermittent sealing communication between poppet 282 and seat 296 can be effectuated via the biasing of springs 292, 294. Sealing may also be effectuated by o-rings 291 disposed about alignment stem 288 to maintain frictional contact between the outer surface of alignment stem 288 and an inner surface defining the bore of orifice 278, thereby further preventing fluid communication between the separator and the water outlet. Upon the unseating of poppet 282, however, water is received between the inner surface defining the bore of orifice 278 and an outer surface of alignment stem 288 to lubricate o-rings 291. Such an arrangement enables poppet 282 to be disposed in the orifice such that poppet 282 is translatable in the direction of the rise or fall of the water level as a result of the rising or falling of float 276.

Alignment stem 288 is further configured to include flow channels 293a, 293b, 293c laterally and longitudinally disposed therein to allow for the flow of water out of the separator. A laterally disposed flow channel 293a is disposed intermediate lower surface 290 of poppet 282 and o-ring 291 positioned adjacent lower surface 290 of poppet 282 and is dimensioned to extend through alignment stem 288. A longitudinally disposed flow channel 293b is configured to intersect the laterally disposed flow channel 293a and to extend to a lower end of alignment stem 288 proximate lower spring 294. The configuration of laterally disposed flow channel 293a and longitudinally disposed flow channel 293b allows fluid communication to be maintained between the inside of the separator and the water outlet. A laterally disposed flow channel 293c may also be disposed intermediate o-ring 291 positioned adjacent lower surface 290 of poppet 282 and another o-ring 291 to provide water flow to the inner surface that defines the bore of orifice 278, thereby lubricating o-rings 291 and effectuating the efficient travel of alignment stem 288 within the bore of orifice 278.

Plunger 284 includes a stopper 298 disposed on an end thereof distal from upper surface 286. Plunger 284 is slidably engaged by one end of a collar 299 such that collar 299 is translatable along plunger 284 between upper surface 286 and a lower end of stopper 298. Float 276 is fixedly disposed at an opposing upper end of collar 299. Upper spring 292 is disposed between a lower portion of float 276 and an upper surface of stopper 298 to provide biasing translational movement to poppet 282.

Float spring assembly 270 is rendered operational by a change in the weight of float 276 to either open or close the water outlet. As the water level in the separator decreases, an increased force is exerted on upper spring 292 due to a decrease in the amount of water displaced by float 276. Such an increase in force exerted on upper spring 292 causes upper spring 292 to compress. A combination of the compression of upper spring 292 and the increase in the weight of float 276 exerted on upper surface 286 of poppet 282 in turn compresses lower spring 294 and biases poppet 282 in the direction of orifice 278. Upon contact of lower surface 290 of poppet 282 with seat 296, fluid communication between the separator and the water outlet is effectively prevented. Variations in the water level, which would heretofore have caused poppet 282 to be inadvertently seated from its open position or unseated from its sealing position in orifice 278, are compensated for by the opposing forces of springs 292, 294, thereby allowing poppet 282 to maintain a fluid seal on seat 296.

Figure 8:
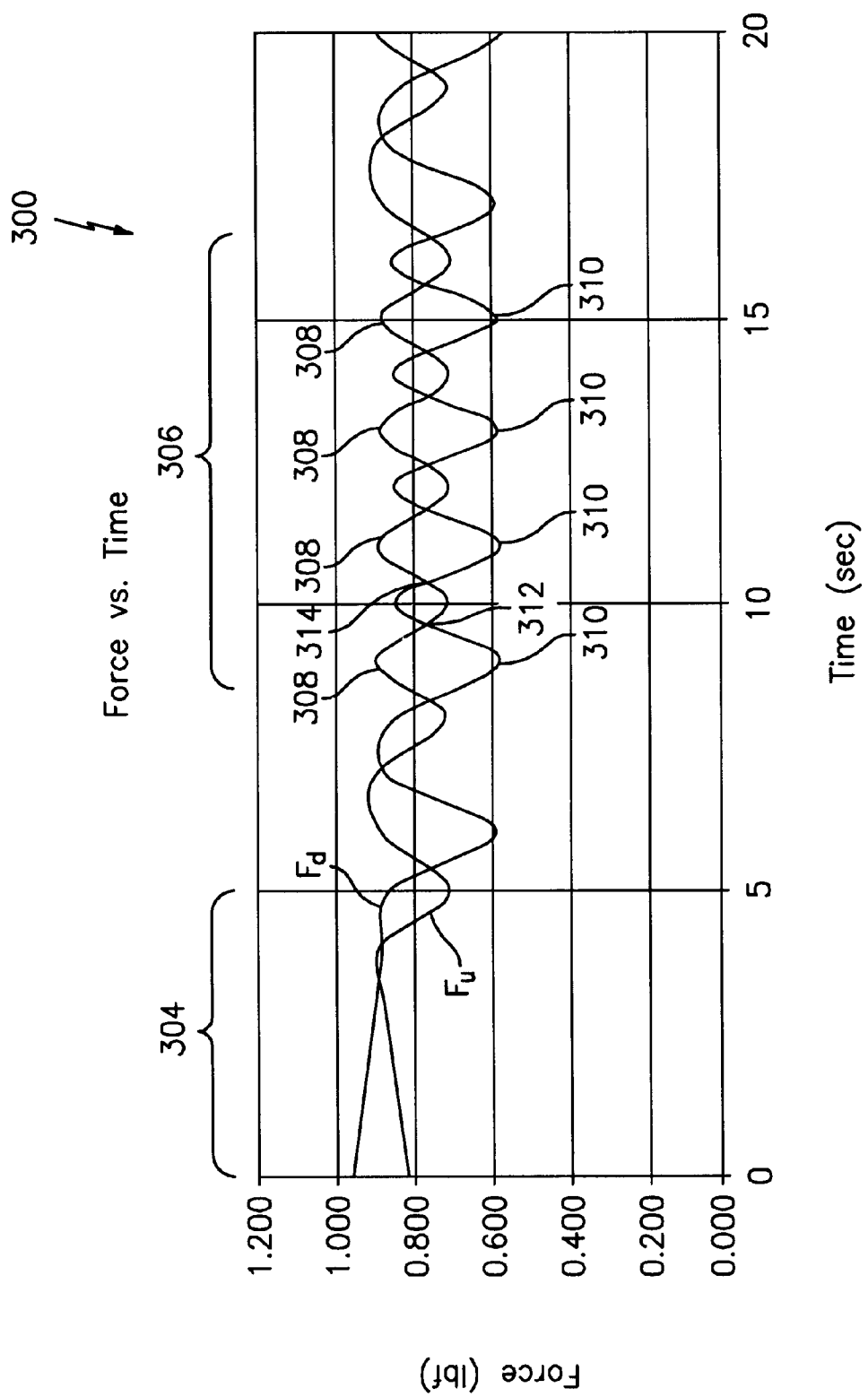
FIG. 8 is a graphical representation of the cyclic frequency of operation of the alternate float assembly of FIGS. 7A and 7B.

Referring now to FIG. 8, a graphical representation of the cyclic frequency of operation of the float assembly operating via the double spring poppet assembly is shown generally at 300 and is hereinafter referred to as "graph 300." The lines of graph 300 represent the opposing forces acting on the poppet assembly over time. The line denoted as $F_d$ is representative of the total downward-acting force on the upper surface of the poppet. Force $F_d$ causes the lower surface of the poppet to engage the elastomeric member disposed on the seat, thereby effectively preventing the flow of water through the water outlet. The line denoted as $F_u$ is representative of the total upward-acting force on the lower surface of the poppet. Force $F_u$ causes the lower surface of the poppet to disengage the elastomeric member disposed on the seat to allow for fluid communication between the separator and the water outlet.

After an initial startup phase 304, a steady state period of a complete cycle of the opposing forces $F_d$, $F_u$ is shown generally at 306. Over steady state period 306, corresponding peaks 308 of $F_u$ and troughs 310 of $F_d$ are noted as being indicative of a decreased water level in the separator. As force $F_d$ increases and force $F_u$ decreases, the poppet "unseats" and the water outlet opens. Points 312 (at which the lines representative of forces $F_d$ and $F_u$ intersect) determine the points at which the valve opens. The immediate subsequent points 314 of intersection of the lines then determine the points at which the poppet "seats" and the valve closes. The times between the alternating unseating and seating of the poppet defined by points 312, 314 are used to determine the water level in the separator, which in turn affects the pressure change within the separator. Minimization of variations in the water level yields a more desirable smaller pressure change in the separator.

Referring back to FIG. 5A, a water flow shut-off is provided in the event of a system failure upon the detection of an over-fill condition in the phase separator. Although the water flow shut-off is described with reference to FIG. 5A, it should be understood by those of skill in the art that such a water flow shut-off is incorporable into any phase separator unit. In separator 144 illustrated in FIG. 5A, however, if the water level was allowed to rise unchecked above the float, water would flow into the hydrogen gas line and create the potential for a negative effect to be realized by the various downstream components of the system. A coalescer hood 150 that encloses a coalescing filter 152 is provided such that, upon full lift of float 176a, the gas flow as well as the water flow from the vessel is stopped. In still another embodiment, coalescer hood 150 is configured to block the float and at least partially prevent water flow through the fluid inlet and/or the hydrogen outlet.

Referring now to all of the FIGURES, it will be appreciated that the exemplary embodiments disclosed may be achieved specifically as shown or in equivalent form. For example, in FIG. 3A, separator 44 is shown comprising body portion 68 upon which inlet cap 65 and outlet cap 67 are disposed and float assembly 70. Either or both separator 44 and float assembly 70 may be formed of fewer or more components than those illustrated and described. For example, separator 44 may be formed of a single molded component having inlet cap 65 and outlet cap 67 integrally formed therewith. Also, inlet cap 65 and outlet cap 67 may be threadedly mounted to body portion 68, frictionally retained in the ends of body portion 68, or bolted into the ends of body portion 68 with a gasket (not shown) disposed therebetween to prevent water leakage from separator 44.

Advantages of the present invention include simplicity of assembly and preparation, lower separator cost, ease of assembly, fewer components, and decreased space requirements.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A gas producing system, comprising:
   an electrochemical cell;
   a liquid feed in fluid communication with said electrochemical cell, said electrochemical cell electrochemically converts said liquid feed into one or more outputs;
   an energy source configured for providing energy to said electrochemical cell; and
   a gas/liquid separator in fluid communication with said electrochemical cell, at least one of said outputs being a multi phase mixture fed to said gas/liquid separator, said gas/liquid separator comprising a vessel comprising a fluid inlet, a first fluid outlet, and a second fluid outlet, and a float within said vessel, said float interfacing said first fluid outlet to at least partially prevent fluid removal through said first fluid outlet when said float is at least in partial contact with said first fluid outlet, said first fluid outlet having a diameter determined by the ratio of a buoyant force $F_B$ of said float to an output force $F_O$ at said first fluid outlet, said ratio being between about 0.5 and about 0.95.

2. The gas producing system as in claim 1, wherein said float comprises a guiding portion and said vessel is configured with a mating portion in fluid communication with said first fluid outlet.

3. The gas producing system as in claim 2, wherein said float further comprises a scaling portion extending from said guiding portion of said float that is receivable within an opening in said mating portion in said vessel to prevent fluid flow through said fist fluid outlet when said float interfaces said first fluid outlet.

4. The gas producing system as in claim 1, wherein said vessel further comprises a blocking portion configured and positioned to block said float thereby minimizing liquid flowing from said fluid inlet to said second fluid outlet.

5. The gas producing system as in claim 1, wherein said vessel further comprises a coalescing filter for filtering liquid from a stream comprising said portion of said gas exiting said vessel through said second fluid outlet.

6. The gas producing system as in claim 5, wherein said vessel further comprises a blocking portion configured and positioned to block said float, thereby preventing liquid flowing from said fluid inlet to said coalescing filter.

7. The gas producing system of claim 1 wherein said ratio of said buoyant force $F_B$ to said output force $F_O$ is between about 0.8 and about 0.95.

8. The gas producing system of claim 1 wherein said float comprises a direct-lift float.

9. The gas producing system of claim 1 wherein said float is defined by an outer surface comprising a region configured for fluid passage.

10. A gas producing system, comprising:
    an electrochemical cell;
    a liquid feed source disposed in fluid communication with said electrochemical cell;
    an energy source configured to provide energy to said electrochemical cell;
    a phase separation apparatus disposed in fluid communication with said electrochemical cell and configured to receive a multi-phase output from said electrochemical cell, said phase separation apparatus having a liquid outlet;
    a float disposed within said phase separation apparatus; and
    a double spring poppet assembly in communication with said float, said poppet assembly disposed in said phase separation apparatus and comprising,
       a poppet configured to effectuate intermittent sealing communication with said liquid outlet of said phase separation apparatus,
       an upper spring disposed in resilient communication with said poppet and said float, and
       a lower spring fixedly mounted and disposed in resilient communication with said poppet.

11. The gas producing system of claim 10 wherein said electrochemical cell is a proton exchange membrane electrolysis cell.

12. The gas producing system of claim 10 wherein said system is configured to produce hydrogen and oxygen from to electrolytic decomposition of water.

13. The double spring poppet assembly of claim 10 wherein said upper spring is fixedly mounted to said float and is disposed in resilient communication with an upper surface of said poppet and wherein said lower spring is fixedly mounted within an orifice and is disposed in resilient communication with a lower surface of said poppet.

14. The double spring poppet assembly of claim 13 further comprising:
    a plunger extending substantially normally from said upper surface of said poppet; and
    an alignment stem depending substantially normally from said lower surface of said poppet.

15. The double spring poppet assembly of claim 14 further comprising a collar fixedly disposed on said float, said collar being in slidable communication with said plunger.

16. The double spring poppet assembly of claim 14 wherein said resilient communication with said upper surface of said poppet is through said plunger.

17. The double spring poppet assembly of claim 14 wherein said resilient communication with said lower surface of said poppet is through said alignment stem.

18. The double spring poppet assembly of claim 14 wherein a seal is disposed between an outer surface of said alignment stem and an inner surface defining said orifice.

19. The double spring poppet assembly of claim 18 wherein said seal is an o-ring.

20. The double spring poppet assembly of claim 10 wherein said sealing communication between said poppet and said liquid outlet is effectuated by an elastomeric member disposed around said liquid outlet.

* * * * *